United States Patent [19]
Johnson et al.

[11] Patent Number: 5,320,167
[45] Date of Patent: Jun. 14, 1994

[54] AIR CONDITIONING AND REFRIGERATION SYSTEMS UTILIZING A CRYOGEN AND HEAT PIPES

[75] Inventors: Dale T. Johnson, Minneapolis, Minn.; Roland L. Roehrich, Pittsburgh, Pa.; Herman H. Viegas, Bloomington, Minn.

[73] Assignee: Thermo King Corporation, Minneapolis, Minn.

[21] Appl. No.: 982,543

[22] Filed: Nov. 27, 1992

[51] Int. Cl.$^5$ .............................................. F25B 29/00
[52] U.S. Cl. ........................................ 165/64; 165/61; 62/159; 62/200; 62/239; 62/275
[58] Field of Search .................... 165/58, 61, 62, 64; 62/156, 159, 199, 200, 205, 239, 275

[56] References Cited

U.S. PATENT DOCUMENTS

| | | | |
|---|---|---|---|
| 3,621,673 | 11/1971 | Foust | 165/58 X |
| 3,802,212 | 4/1974 | Martin et al. | 62/156 X |
| 4,045,972 | 9/1977 | Tyree, Jr. | 62/156 |
| 4,100,759 | 7/1978 | Tyree, Jr. | 62/165 X |
| 4,186,562 | 2/1980 | Tyree, Jr. | 62/239 X |
| 4,498,306 | 2/1985 | Tyree, Jr. | 62/239 X |
| 4,606,198 | 8/1986 | Latshaw et al. | 62/205 |
| 4,941,527 | 7/1990 | Toth et al. | 165/61 X |
| 5,040,374 | 8/1991 | Michaeu | 62/52.1 |
| 5,069,039 | 12/1991 | Martin | 62/156 X |
| 5,090,209 | 2/1992 | Martin | 62/156 X |

Primary Examiner—John Rivell
Attorney, Agent, or Firm—M. J. Moran

[57] ABSTRACT

A refrigeration system, which conditions the air of a conditioned space via heating and cooling cycles, includes a heat exchanger and, in a first embodiment, heat pipes. A cryogen is circulated through the heat exchanger during a cooling cycle. During a heating cycle the flow of cryogen is terminated and heat is transferred into the heat exchanger via the heat pipes. In another embodiment, the temperature of evaporation of a liquid cryogen in the heat exchanger is selected according to the desired temperature of the conditioned space, via selectable cryogen flow paths which provide different pressures and thus different evaporation temperatures. Vaporized cryogen drives a motor connected to a fan which circulates air between the conditioned space and heat exchanger. In still another embodiment, the mass flow rate of liquid cryogen is controlled as a function of the degree of superheat in evaporated cryogen exiting the heat exchanger, and as a function of a predetermined floor temperature of conditioned air discharged into the conditioned space.

22 Claims, 6 Drawing Sheets

AIR CONDITIONING AND REFRIGERATION SYSTEMS UTILIZING A CRYOGEN AND HEAT PIPES

TECHNICAL FIELD

The invention relates in general to air conditioning and refrigeration systems, and more specifically to stationary and transport air conditioning and refrigeration systems which utilize a cryogen.

BACKGROUND ART

Transport refrigeration systems condition the air of a refrigerated space of a vehicle, hereinafter called the "conditioned space", such as a straight truck, the trailer of a tractor-trailer combination, a refrigerated container, and the like, with the air of the conditioned space being controlled to a narrow temperature range around or adjacent to a predetermined set point temperature. Such systems conventionally utilize a chlorofluorocarbon (CFC) refrigerant in a mechanical refrigeration cycle. The mechanical refrigeration cycle requires a refrigerant compressor driven by a prime mover, which often includes a dedicated internal combustion engine, such as a diesel engine. Because of the suspected depleting effect of CFC's on stratospheric ozone ($O_3$), and the detrimental effects of diesel emissions, practical alternatives to the use of CFC's are being sought.

The use of a cryogen, i.e., a gas which has been compressed to a very cold liquid state, such as carbon dioxide ($CO_2$) and nitrogen ($N_2$), in a transport refrigeration system is particularly attractive because, in addition to eliminating the need for a CFC, it also eliminates the need to transport a compressor and associated prime mover. Refrigeration systems of which we are aware which utilize a cryogen, implement a cooling cycle by circulating the cryogen through a fluid flow path, or flow paths, of a heat exchanger which is in heat exchange relation with air from the conditioned space. When a heating cycle is required to hold the set point temperature, or a defrost cycle is required, the cryogen is heated by a suitable burner and combustible fuel, and the heated cryogen is circulated through the fluid flow path, or flow paths, of the conditioned space heat exchanger. Thus, cryogen is expended during a cooling cycle, and cryogen plus a fuel associated with the heat source, such as propane, liquid natural gas, and the like, are both expended to implement heating and defrost cycles.

It would be desirable, and it is an object of the present invention, to provide new and improved cryogenic based air conditioning and refrigeration systems, suitable for both transport and stationary applications, which more effectively and efficiently utilize the cryogen, for lower cost operation, as well as for an extended operating time in a transport application for a given on-board vessel of cryogen. The term "refrigeration system" will be hereinafter used to generically cover both air conditioning and refrigeration applications, transport and stationary.

Cryogens in a liquid state may be delivered at much colder temperatures than temperatures associated with fresh loads, such as lettuce, for example, and/or the "as delivered" temperature may not be cold enough for certain frozen loads. Thus, it would be desirable, and it is another object of the invention, to provide a refrigeration system utilizing a cryogen which effectively conditions a space containing a fresh load, while minimizing the chance for spot freezing, without compromising the ability of the system to adequately condition a frozen load.

SUMMARY OF THE INVENTION

Briefly, the present invention is a refrigeration system which is associated with a conditioned space to be controlled to a predetermined temperature range around a selected set point temperature via heating and cooling cycles respectively provided by heating means and cryogenic cooling means. In a first embodiment of the invention, the refrigeration system includes at least one heat exchanger having heat pipe means, and means defining a fluid flow path. Means operably interconnects the fluid flow path of the heat exchanger and the cryogenic cooling means to implement a cooling cycle. Heating means applies heat to the heat pipe means to implement a heating cycle. Air mover means circulates air between the conditioned space and the heat exchanger during the cooling and heating cycles.

The air mover means preferably includes a vapor motor which is driven by vaporized cryogen received directly, or indirectly, from a supply of cryogen as a function of the requirements of the conditioned space at any instant. For example, cryogen may be received directly from the supply during a heating cycle, and also during a null cycle, i.e., when the conditioned space does not require either a heating cycle or a cooling cycle to maintain the set point temperature. During a cooling cycle, cryogen may be obtained indirectly from the supply via a heat exchanger. The heating means which heats the heat pipe means includes a supply of combustible fuel, and means for burning the fuel during a heating cycle to heat the heat pipe means. Additional heating means is provided, which may operate from the same fuel supply, with the additional heating means being utilized to heat the vaporized cryogen prior to introducing the cryogen into the vapor motor means. In a preferred embodiment of the invention, the heat pipes and the fluid flow path of the heat exchanger are disposed in heat flow relation with the same thermally conductive heat transfer fins.

The invention also includes a method of cooling a conditioned space to a selected set point temperature of a predetermined temperature range, via a refrigerant source and heat exchanger means. The method, which selects two or more optimum temperatures at which a refrigerant evaporates, includes the steps of selecting a refrigerant having predetermined thermodynamic properties, dividing the temperature range into at least first and second segments, and selecting a pressure range for each of the segments of the temperature range according to the thermodynamic properties of the refrigerant, to provide corresponding saturated pressure ranges. The method further includes the steps of providing expansion devices which will provide the corresponding saturated pressure ranges, and connecting the expansion devices in selectable parallel flow paths between the refrigerant source and heat exchanger means, to provide a pressure related flow path associated with each segment of the temperature range. The method then includes the steps of determining which temperature segment is associated with the selected set point temperature, and selecting the pressure related flow path which is associated with the determined temperature segment, for directing flow of refrigerant between the refrigerant source and the heat exchanger means.

The invention also includes a refrigeration system for cooling a conditioned space to a selected set point temperature within a predetermined temperature range. The refrigeration system includes, a refrigerant source, heat exchanger means, and means defining a plurality of selectable pressure related flow paths connected in parallel between the refrigerant source and the heat exchanger means. The pressure related flow paths provide refrigerant to the heat exchanger means at different predetermined pressures selected to divide the predetermined temperature range into predetermined segments. The refrigeration system further includes means for operably selecting one of the pressure related flow paths for flow of refrigerant from the refrigerant source to the heat exchanger means according to the segment of the temperature range which includes the selected set point temperature to which the conditioned space is to be cooled.

The invention also includes a refrigeration system for controlling the temperature of a conditioned space to a predetermined temperature range adjacent to a selected set point temperature via at least a cooling cycle, with the refrigeration system including cryogenic cooling means in a liquid state. The refrigeration system includes heat exchanger means defining a fluid flow path, and means including controllable modulation valve means for operably interconnecting the fluid flow path of the heat exchanger means and the cryogenic cooling means to implement a cooling cycle via evaporation of liquid cryogen in the heat exchanger means. The refrigeration system further includes means for determining the degree of superheat in the evaporated cryogen exiting the heat exchanger means, and control means for controlling the modulation valve means to provide a mass flow of liquid cryogen to the heat exchanger means as a function of the degree of superheat in the evaporated cryogen.

In a preferred embodiment of the invention the refrigeration system which modulates the mass flow rate of the liquid cryogen further includes air mover means for drawing air from the conditioned space, moving the air in heat exchange relation with the heat exchanger means, and for discharging conditioned air into the conditioned space. Means is provided for sensing the temperature of the discharged conditioned air, and control means further controls the modulation valve means and the mass flow rate of liquid cryogen to the heat exchanger means as a function of the temperature of the discharged conditioned air, decreasing the mass flow rate to prevent the temperature of the discharged conditioned air from falling below a predetermined floor value.

The invention also includes a method of operating a refrigeration system to control the temperature of a conditioned space to a predetermined temperature range adjacent to a selected set point temperature via at least a cooling cycle, with the refrigeration system including cryogenic cooling means in a liquid state and heat exchanger means. The method includes the steps of modulating the flow of liquid cryogen from the cryogenic cooling means to the heat exchanger means to implement a cooling cycle via evaporation of liquid cryogen in the heat exchanger means, determining the degree of superheat in the evaporated cryogen exiting the heat exchanger means, and controlling the mass flow of liquid cryogen from the cryogenic cooling means to the heat exchanger means as a function of the degree of superheat in the evaporated cryogen.

In a preferred embodiment, the method also includes the steps of drawing air from the conditioned space, moving the air in heat exchange relation with the heat exchanger means, discharging conditioned air into the conditioned space, sensing the temperature of the discharged conditioned air, and controlling the mass flow rate of liquid cryogen from the cryogenic cooling means to the heat exchanger means as a function of the temperature of the discharged conditioned air, with the controlling step including the step of decreasing the mass flow rate to prevent the temperature of the discharged conditioned air from falling below a predetermined floor value.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

As used in the following description and claims, the term "conditioned space" includes any space to be temperature and/or humidity controlled, including stationary and transport applications for the preservation of foods and other perishables, maintenance of a proper atmosphere for the shipment of industrial products, space conditioning for human comfort, and the like. The term "refrigeration system" is used to generically cover both air conditioning systems for human comfort, and refrigeration systems for preservation of perishables and shipment of industrial products. Also, when it is stated that the temperature of a conditioned space is controlled to a selected set point temperature, it is to be understood that the temperature of the conditioned space is controlled to a predetermined temperature range adjacent to the selected set point temperature. In the Figures, valves which are normally open (n.o.) are illustrated with an empty circle, and valves which are normally closed (n.c.) are illustrated with an "X" within a circle. Of course, the valve selection and associated electrical or electronic control, hereinafter called "electrical control", may be changed to reverse the normally open and normally closed states shown. An arrow pointed at a valve in the Figures indicates the valve is, or may be, controlled by the electrical control.

Figure 1:
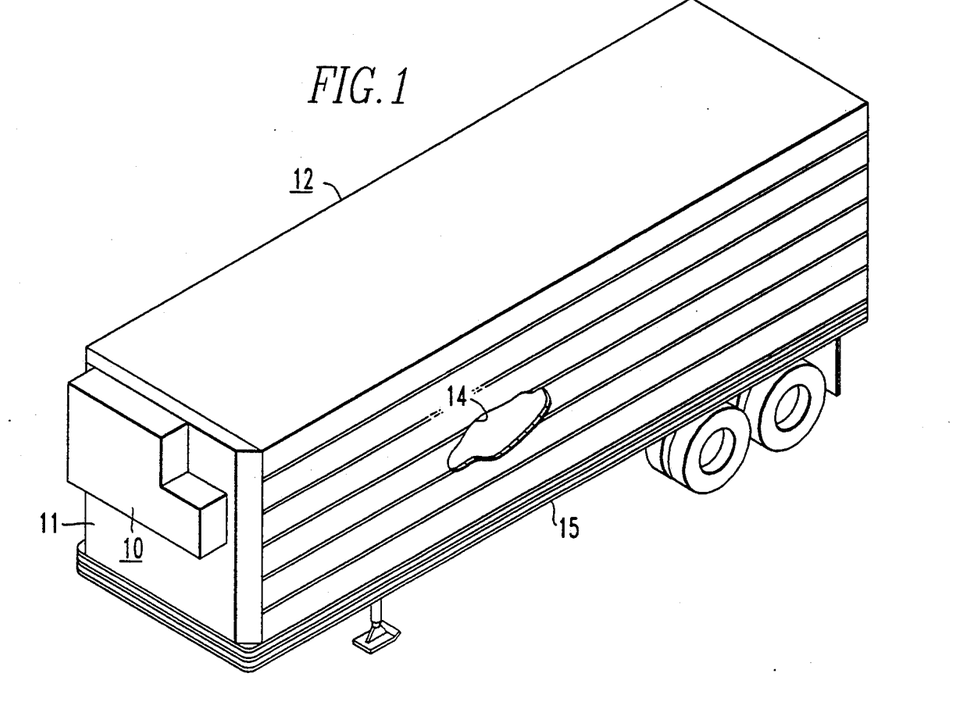
FIG. 1 is a perspective view of a refrigeration system constructed according to the teachings of the invention, shown mounted on a front wall of a trailer.

Referring now to the drawings, and to FIG. 1 in particular, there is shown a refrigeration system 10 which is suitable for use with any conditioned space, and particularly well suited for use on straight trucks, tractor-trailer combinations, containers, and the like. The word "vehicle" being used to generically refer to the various transport vehicles which utilize refrigeration systems.

Figure 2:
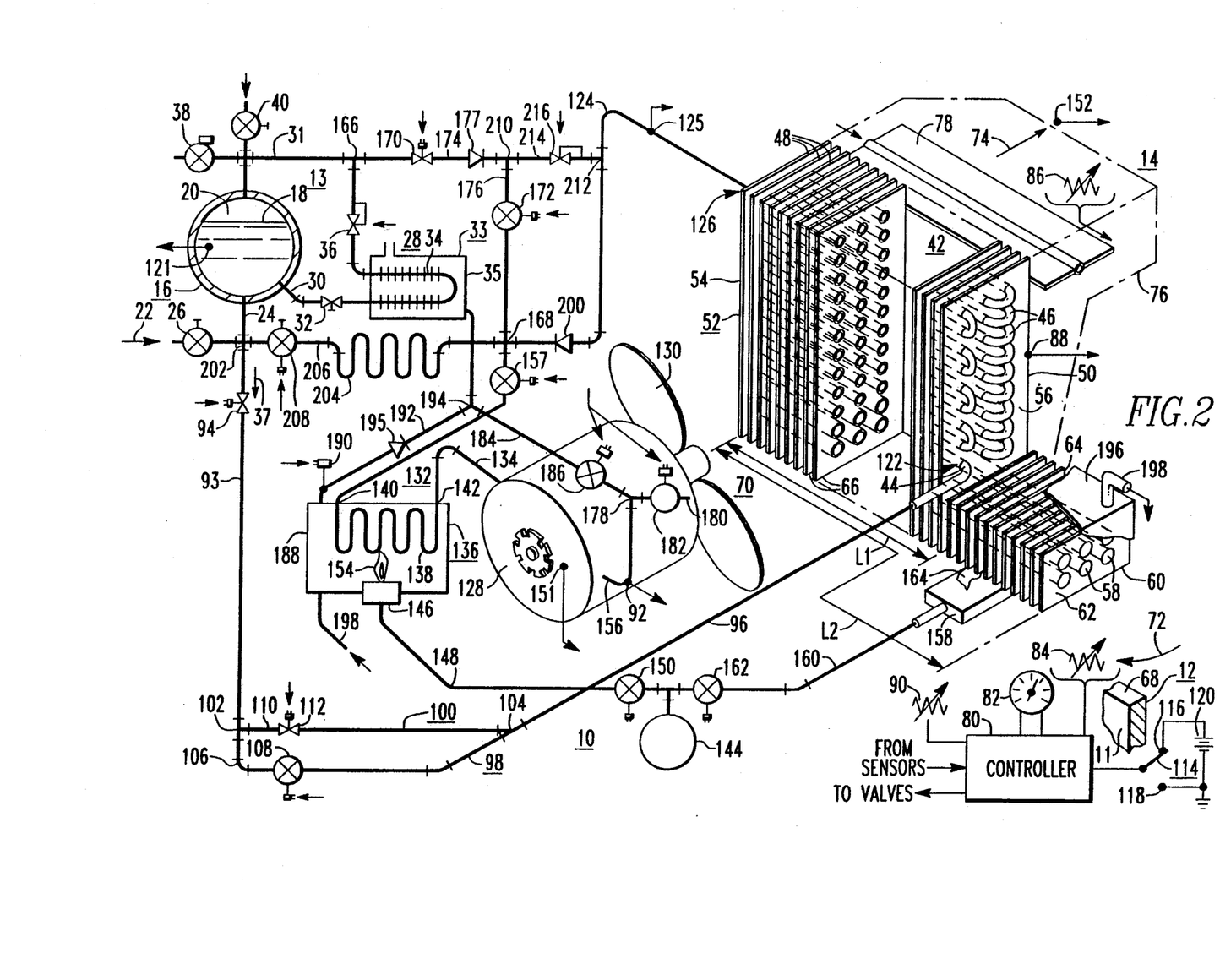
FIG. 2 is a detailed diagrammatic representation of the refrigeration system shown in FIG. 1, wherein a cryogen provides cooling during a cooling cycle and combustible fuel and heat pipes provide heat during heating and defrost cycles.

More specifically, FIG. 1 illustrates a perspective view of a refrigeration system 10 constructed according to the teachings of the invention, with refrigeration system 10 being illustrated on the nose 11 of a vehicle 12, which, for purposes of example is a trailer. Cryogen and fuel supply vessels or tanks, to be hereinafter described, may be mounted in any suitable location, such as on the nose or front wall 11 of vehicle 12, or suspended from the underside 15 thereof. Referring now to FIG. 2, there is shown a detailed diagrammatic representation of an exemplary implementation of the refrigeration 10 shown in FIG. 1.

Refrigeration system 10 may be used with a vehicle 12 having a single conditioned space 14 to be controlled to a pre-selected set point temperature, and also when conditioned space 14 is compartmentalized or divided into two or more separate conditioned spaces to be individually controlled to selected set point temperatures, which may be different in different conditioned spaces.

Refrigeration system 10 shown in FIG. 2 includes cryogenic cooling means 13. Cryogenic cooling means 13 includes an on-board thermally insulated, or vacuum, supply vessel 16 containing a suitable cryogen, such as liquid nitrogen ($N_2$), or liquid carbon dioxide ($CO_2$), for example, indicated at 18. Vessel 16 also contains cryogen 20 in vapor form, above the liquid level. Vessel 16 may be filled with the selected cryogen, for example, by connecting suitable ground support apparatus, which term includes trucks, shown generally at 22, to a supply line or conduit 24 which includes a valve 26.

Vapor pressure in vessel 16 is maintained above a predetermined value by a pressure building and regulating arrangement 28 in which conduits 30 and 31 respectively connect pressure building means 33 to lower and upper points of supply vessel 16. Conduit 30, which connects a low point of vessel 16 to pressure building means 33, includes a valve 32 which permits liquid flow as the pressure in vessel 16 drops. The pressure building means 33 includes a vaporizing coil 34, which may be directly exposed to ambient temperatures, or which may be disposed within a housing 35, as will be hereinafter explained. Conduit 31, which connects pressure building means 33 to a high point of supply vessel 16, includes a valve 36 which permits flow of vapor as the pressure in vessel 16 drops. A pressure reading safety valve 38 is provided in conduit 31 at a point where the vapor pressure in vessel 16 may be directly sensed. A venting valve 40 is also provided to facilitate the filling process. Valve 40 may be connected to the ground support apparatus 22 during filling, if desired.

Valve 32 opens when the pressure in vessel 16 falls to a predetermined value. The predetermined value is selected to enable liquid cryogen 18 to flow into the pressure building arrangement 28, as well as into a fluid flow path, indicated by arrow 37, which is associated with a cooling cycle of refrigeration system 10. When the cryogen is $CO_2$ the predetermined value is selected to be above the triple point of $CO_2$, i.e., 75.13 psia, and in this instance arrangement 28 regulates the vapor pressure in vessel 16 to at least about 80 psia, for example.

As hereinbefore stated, valve 32 admits liquid cryogen into vaporizing coil 34, and vaporizing coil 34, which is exposed to vaporizing temperatures, such as the ambient temperature outside of vehicle 12, warms and vaporizes the liquid cryogen. In embodiments of the invention to be hereinafter described, vaporizing coil 34 may be exposed to higher temperatures than ambient, especially during low ambient temperature conditions, by utilizing gases produced by products of combustion of a fuel used during heating and defrost cycles, and also from a fuel used to produce higher fan horsepower; or, by utilizing warm cryogen just before it is exhausted to the atmosphere.

Using $CO_2$ as an example of a suitable cryogen, in a first example of as-delivered characteristics, vessel 16 may be filled with $CO_2$ at, an initial pressure of about 100 psia and an initial temperature of about $-58°$ F. ($-50°$ C.), which will thermodynamically satisfy the low temperature end of a normal temperature control range of transport refrigeration systems. Of course, other pressures and temperatures may be used. For a second example, the liquid cryogen 18 may be $CO_2$ delivered from ground support apparatus 22 at a pressure of 300 psia and a temperature of $0°$ F. ($-17.8°$ C.). In the first example, the temperature of the cryogen is low enough to thermodynamically maintain any desired set point temperature, or temperatures, in the associated conditioned space, or spaces. In the second example, the low end of a conventional selectable cooling range for refrigeration system 10 may go well below the "as delivered" temperature of the cryogen. For example, the low end of the selectable range may be $-20°$ F. ($-28.9°$ C.). Refrigeration system 10 includes means for selecting or adjusting the evaporation temperature of the cryogen to meet the required temperature of the conditioned space 14, regardless of the "as delivered" temperature, as will be hereinafter explained.

Refrigeration system 10 includes heat exchanger means 42. Heat exchanger means 42 includes one or more fluid flow paths 44, such as those conventionally formed of a plurality of interconnected metallic hair pin tubes 46 which are in thermal contact with a plurality of closely spaced metallic heat transfer fins 48 which extend from tube to tube. The fluid flow path, or flow paths, indicated generally at 44, form a first portion 50 of a heat exchanger structure 52, with the first portion 50 having first and second longitudinal ends 54 and 56, respectively, and a predetermined longitudinal length L1; or, generally equivalent arrangements may be used.

Heat exchanger means 42 further includes a plurality of heat pipes 58 which extend in heat transfer relation with the same fins 48 which are in heat transfer relation with the hair pin tubes 46. The heat pipes 58 may be of conventional construction, including a close-ended metallic tube, such as copper of any desired cross-sectional configuration, containing a suitable liquid, such as ammonia ($NH_3$) or water. The liquid evaporates when heated, absorbing the heat of vaporization, and the vapors condense back into a liquid when cooled, giving up the heat of condensation. A suitable wicking material, or equivalent, may be placed inside the tubular outer shell of the heat pipe, such as a rolled up screen or mesh formed of copper, to insure that condensed liquid will return to the vaporizing end of the heat pipe.

Heat pipes 58 are disposed in good heat transfer relation with the first portion 50 of heat exchanger structure 52. Heat pipes 58 may be mounted in any desired orientation, horizontally, vertically, or any angle therebetween. To obtain the requisite good heat transfer from heat pipes 58 to the first portion 50 of heat exchanger structure 52, they may be clamped to the first portion 50; or, the heat pipes 58 may extend through tight, i.e., press fit, openings, in fins 48; and equivalents thereof.

In the embodiment of the invention illustrated in FIG. 2, the heat pipes 58 are substantially horizontally oriented, with the heat pipes 58 forming a lower or second portion 60 of heat exchanger structure 52. The second portion 60 has a first longitudinal end which may coincide with the first longitudinal end 54 of the first portion 50, and a second longitudinal end 62. The second portion 60 defines a longitudinal dimension L2 which exceeds the longitudinal dimension L1 of the first portion 50 by a substantial dimension, with the second portion 60 thus including a structure 64 which extends past the second longitudinal end of the first portion 50. This outwardly extending structure 64 of the second portion 60 may also include a plurality of closely spaced metallic, parallel heat transfer fins 66 which extend from heat pipe to heat pipe. The outwardly extending structure 64 of the second portion 60 forms a vaporizing end for the heat pipes 58, to which heat is applied during a heating or defrost cycle, as will be hereinafter explained.

Heat exchanger means 42 is mounted on the outside wall of nose portion 11 of vehicle 12, adjacent to an opening 68. Air mover means 70 draws air from conditioned space 14 through opening 68, with this "return air" being indicated by arrow 72. Air mover means 70 forces the air from conditioned space 14 through, and in heat exchange relation with, heat exchanger structure 52, with this conditioned discharge air being indicated by arrow 74. Discharge air 74 enters conditioned space 14 via a discharge plenum 76 which directs the conditioned air through the opening 68. An optional defrost damper 78 may be disposed in discharge plenum 76, with defrost damper 78 having an open position, and a closed position which prevents conditioned air from being discharged into conditioned space 14. If air mover means 70 is stopped during a defrost cycle, defrost damper 78 is not required.

An electrical control module or controller 80 determines whether conditioned space 14 requires a cooling cycle or a heating cycle to hold the temperature of conditioned space 14 to a predetermined set point temperature. The set point temperature is selected via a set point temperature selector 82. Control 80 also determines when a defrost cycle is required to remove water frost and ice which may build up on heat exchanger structure 52. Additional inputs to electrical control 80 include inputs from a return air temperature sensor 84, a discharge air temperature sensor 86, a temperature sensor 88 which detects the surface temperature of heat exchanger structure 52, an ambient air temperature sensor 90, and a temperature sensor 92 associated with air mover means 70.

Cryogenic cooling means 13 is connected to the fluid flow path 44 of heat exchanger means 42 via the hereinbefore mentioned fluid flow path 37. Fluid flow path 37 includes a conduit 93 having a flow control valve 94 for controlling the flow of liquid cryogen 18, and a conduit 96 connected to fluid flow path 44. Conduit 93 may be connected directly to conduit 96 when cryogen 18 will always be delivered at a temperature which will thermodynamically meet the requirements of the selected set point temperature, e.g., an as-delivered temperature of $-58°$ F. ($-50°$ C.). When cryogen may be delivered at a temperature which will not thermodynamically satisfy the low temperature end of the selectable temperature range, first and second selectable parallel branches 98 and 100 are connected between conduits 93 and 96 via first and second tees 102 and 104. The first parallel branch 98 includes a conduit 106 having a valve 108, and the second parallel branch 100 includes a conduit 110 having an expansion valve 112. Expansion valve 112 may have a fixed orifice, or a controllable orifice, as desired.

When control 80 detects that conditioned space 14 requires a cooling cycle to achieve or hold the set point temperature selected on temperature selector 82, control 80 selects one of the parallel branches 98 or 100 as a function of the magnitude of the selected set point temperature and the temperature of the cryogen 18 in vessel 16. If, for example, cryogen 18 is delivered at one of the two temperatures used in the previous example, i.e., $0°$ F. ($-17.8°$ C.) or $-58°$ F. ($-50°$ C.), a selector switch 114 connected to control 80 may be used to indicate to control 80 which temperature cryogen is being used. Switch 114, for example, may provide a logic one input in a first position 116 of switch 114, and a logic zero input in a second position 118, with a source of potential being indicated as being a battery 120. A logic one input, for example, may be used to indicate the lower of two delivery temperatures, and a logic zero the higher of the two temperatures.

When the cryogen 18 in vessel 16 is at the lower of the two temperatures, i.e., a temperature which will thermodynamically handle the complete temperature range of transport refrigeration system 10, control 80 will select the first branch 98, opening valve 108, while maintaining branch 100 closed. If the cryogen 18 in vessel 16 is at the higher of the two temperatures, control 80 determines if the set point temperature selected is above or below a predetermined value, such as $+20°$ F. ($-6.7°$ C.). When the set point temperature is above this predetermined value it indicates that the "as supplied" temperature of cryogen 18 is thermodynamically adequate, and valve 112 will be closed and valve 108 is opened. When the set point temperature is at or below the predetermined value it indicates that the "as supplied" temperature may not be thermodynamically adequate, control 80 closes valve 108, and expansion valve 112 will be activated, to provide an orifice size which will drop the pressure and the corresponding evaporation temperature of the cryogen 18 to a temperature value which will thermodynamically satisfy the selected set point temperature.

In a preferred embodiment of the invention, the need for selector switch 114 is eliminated by providing a temperature or pressure sensor 121. Sensor 121 is disposed to sense the temperature or vapor pressure of the cryogen 18 or 20 in vessel 16, with the output of sensor 121 being connected to control 80. Controller 80 automatically determines the correct fluid flow path, and thus the correct expansion to provide a desired evaporation temperature, according to the actual characteristics of the cryogen, eliminating the possibility of error in operation of switch 114.

Conduit 96 enters an entrance end 122 of the fluid flow path 44, with the entrance end being a header when a plurality of parallel fluid flow paths are used. The conditioned space return air 72 is moved over and through heat exchanger structure 52 by the air mover means 70, removing heat from the return air 72, and discharging conditioned air 74 back into conditioned space 14. The heat removed from return air 72 vaporizes the cryogen flowing through the fluid flow path 44, and may superheat it. The vaporized cryogen exits heat exchanger structure 52 via a conduit 124 at an exit end 126, which will also be a header when more than one fluid flow path 44 is used. The temperature of the cryogen at the exit end 126 of heat exchanger 42 is determined, such as by utilizing a sensor 125 arranged to detect the temperature of the cryogen flowing through conduit 124. The output of sensor 125 is connected to controller 80. Sensor 125, or sensor 88, or both, may be used, for example, to detect when a defrost cycle is necessary.

When conditioned space 14 is compartmentalized to provide one or more additional conditioned spaces, conduit 124, as a first example, may be connected to a heat exchanger in an adjacent compartment, with this additional heat exchanger being associated with a higher temperature conditioned space than is associated with heat exchanger means 42. As a second example, if it is desired to evaporate liquid cryogen in a heat exchanger, or heat exchangers of additional conditioned spaces, liquid cryogen from conduit 93, or from conduit 96, may be provided via appropriate conduits, valving, and control, for each such additional heat exchanger, as described relative to heat exchanger 42. In the second example, expended cryogen from the first compartment may be heated via suitable heating means and directed to the heat exchanger in the additional compartment to provide heat for the additional compartment during heat and defrost cycles.

After exiting the final heat exchanger, the vaporized cryogen may be discharged to the atmosphere. In a preferred embodiment of the invention, however, which is especially suitable for transport refrigeration applications, the vaporized cryogen is utilized to power the air mover means 70. Air mover means 70 includes a vapor motor or vapor driven turbine, hereinafter generically referred to as vapor motor 128, which drives a blower or fan 130. As disclosed in concurrently filed application Ser. No. 07/982,364, independent control may be incorporated over the blower or fan 130, enabling blower or fan 130 to circulate air throughout conditioned space 14 during cooling and heating cycles, and also without cooling or heating the air of conditioned space 14, e.g., during a null cycle initiated when refrigeration system 10 does not require heating or cooling to maintain the selected set point temperature in conditioned space 14. Thus, during a cooling cycle, instead of discharging warm, vaporized cryogen to the atmosphere, it is directed, via cryogen directing means 132, to an input conduit 134 connected to the input side of vapor motor 128. Vapor motor 128 may be the sole power source for implementing air circulation between conditioned space 14 and heat exchanger 42; or, it may supplement fans or blowers driven by a battery, alternator, generator, internal combustion engine, and the like. In stationary applications of the invention, electric motors connected to electrical mains may be used instead of, or in conjunction with, vapor motors. Also in stationary applications, the expended cryogen may be collected and re-compressed.

In line with the teachings of the hereinbefore mentioned concurrently filed application Ser. No. 07/982,364, the cryogen directing means 132 preferably includes heating means 136 which includes a heat exchanger 138 having an input end 140 connected to conduit 124 via suitable conduits, and an output end 142 connected to conduit 134. Heating means 136 further includes a supply 144 of combustible fuel, such as propane, liquid natural gas, diesel fuel, and the like, a burner 146, and a conduit 148 connected between fuel supply 144 and burner 146 via a valve 150. In stationary applications, heat may be obtained from other suitable sources, including electrical, hot liquids, steam, waste gases, and the like. Thus, when the energy of the vaporized cryogen entering vapor motor 128 is not sufficient to provide the desired air flow in conditioned space 14, which may be detected by an air flow sensor 152, or by speed or RPM sensor means 151 associated with vapor motor 128, for example, control 80 opens valve 150 and ignites the fuel, to provide a flame, indicated at 154. The warmed cryogen exits vapor motor 128 via a conduit 156 which may directly discharge the cryogen to the atmosphere, or which may further be utilized, such as hereinbefore described relative to using expended cryogen for aiding heating and defrosting cycles in an adjacent compartment, or as will be hereinafter explained.

When a cooling cycle is terminated, and when refrigeration system 10 is shut down, it is desirable to provide shut-down isolation in the cryogen flow path by closing a valve on the input side of heat exchanger means 42, e.g., valve 94, and by closing a valve on the output side of heat exchanger means 42 in the cryogen flow path between the exit or output end 126 of heat exchanger means 42 and the input end 140 of heating means 136, such as by providing a valve 157 in conduit 124.

When conditioned space 14 requires a heating cycle to achieve and/or hold the set point temperature, or a heating cycle to defrost heat exchanger structure 52, flow control valve 94 is closed, as no cryogen is utilized in fluid flow path 44 of heat exchanger means 42 to implement a heating cycle. Heat is applied to outwardly extending structure 64 of the second portion 60 of heat exchanger structure 52, which includes the heat pipes 58, via a burner 158 which may be connected to fuel supply 144, or to a different fuel supply, via a conduit 160 which includes a valve 162. Control 80 opens valve 162 and ignites burner 158, to provide a flame 164 which heats the heat pipes 58 and evaporates the fluid therein. The hot vaporized fluid within heat pipes 58 moves to the first portion 50 of heat exchanger structure 52 and it is condensed by the cooler fins 48, giving up the heat of condensation to the fins 48, which heat is conducted upwardly by the fins 48 and into the hair pin tubes 46. Discharge air 74 picks up heat from this heated structure 52 and delivers it to conditioned space 14. Thus, heating and defrosting cycles are provided without heating and expending cryogen, saving the cryogen for cooling cycles, and for driving vapor motor 128. This is especially important in cold ambient temperatures, where a supply of cryogen used as the sole means to implement both cooling and heating cycles, as taught by prior art cryogenic based systems, would soon be depleted.

Instead of applying heat directly to the portions of the heat pipes 58 in the outwardly extending structure 64 of heat exchanger 52, the outwardly extending structure 64 may include a liquid filled enclosure in which the heat application ends of heat pipes 58 are immersed. The liquid in the liquid filled enclosure is heated, such as by utilizing burner 158 to heat the enclosure, and the heated liquid causes the heat pipes 58 to be heated. In such an embodiment, the heat pipes 58, for example, may each have an angle or bend therein which directs the heat application ends downwardly into the liquid filled enclosure. The liquid in the liquid filled enclosure should have a higher boiling point temperature than the evaporation temperature of the liquid in the heat pipes 58. A suitable liquid for the liquid filled enclosure is ethylene glycol, for example. The heat application ends of heat pipes 58 which are immersed in the liquid may, or may not, be finned, as desired.

A defrost cycle is similar to the heating cycle just described, except heated air may be prevented from entering conditioned space 14 during a defrost cycle by closing damper 78. A defrost cycle may be initiated by a timer, by a manual switch, by temperature sensor 88 connected to one of the fins 48, by temperature sensor 125 which detects the exiting temperature of the refrigerant from the heat exchanger means 42, by a programmed algorithm, and the like. Preventing warm air from entering conditioned space 14 during a defrost cycle is preferably accomplished by shutting off the supply of cryogen to vapor motor 128, conserving cryogen during a defrost cycle and eliminating the need for the defrost damper 78. When a defrost damper 78 is provided, it may be desirable to close it and keep vapor motor 128 operating during defrost, as this arrangement may have the advantage of shortening the defrost time.

Vaporized cryogen is not available from heat exchanger structure 52 during a heating cycle and is thus obtained directly from the supply vessel 16 via a selected one of a plurality of different arrangements. A first arrangement receives vaporized cryogen 20 from vessel 16 and pressure building and regulating arrangement 28, such as by tapping conductor 31. Connectors 166 and 168 are respectively provided in conduits 31 and 124, with a flow regulating valve 170 and a valve 172 being connected therebetween in conduits 174 and 176. This arrangement is preferred, as the procedure of vaporizing liquid 18 to create vapor 20 removes heat from the liquid 18, cooling it. A check valve 177 may be disposed in conduit 174 to prevent flow into vessel 16, in the event the pressure in vessel 16 falls below the pressure at junction 210.

As disclosed in concurrently filed application Ser. No. 07/982,333, when the temperature of expended vaporized cryogen exceeds the ambient temperature, by-product heat may be directed to any ambient loops or coils utilized in the system. For example, to vaporize sufficient quantities of liquid cryogen 18 for meeting fan horsepower needs, byproduct heat in expended cryogen may be directed to the vaporizing coil 34. For example, when the temperature of the cryogen being discharged from vapor motor 128 is higher than the ambient temperature, as sensed by sensors 92 and 90, respectively, control 80 may direct the cryogen being discharged from vapor motor 128 to the housing 35 surrounding vaporizing coil 34. For example, discharge conduit 156 may be connected to a tee 178, with one branch of tee 178 being connected to an exhaust conduit 180 via a valve 182, and with the remaining branch being connected to housing 35 via a conduit 184 which includes a valve 186. Thus, when the temperature comparison indicates the need for diversion of the vaporized cryogen to housing 35, controller 80 closes valve 182 and opens valve 186.

An alternative arrangement for adding heat to vaporizing coil 34 includes directing hot combustion gases generated by burner 146 and/or burner 158 to housing 35. For example, a housing 188 may be disposed to surround burner 146 and heat exchanger 138, with a flapper valve 190 being arranged to selectively direct hot gases to housing 35, such as via a conduit 192 which joins conduit 184 via a tee 194. A check valve 195 may be disposed in conduit 192 to insure vapor flow in conduit 184 is directed to housing 35. In like manner a housing 196 may be disposed about the second or extended portion 64 of heat exchanger structure 52 and burner 158, collecting and directing hot gases to housing 35 via a conduit 198. Conduit 198 may be connected directly to housing 35, or conduit 198 may be directed to housing 188, as illustrated, aiding burner 146, and enabling a single valve 190 to control the application of hot gases to vaporizing coil 34. A check valve 200 may be disposed in conduit 124 to prevent hot vapor from flowing back into heat exchanger structure 52.

Instead of using vaporized cryogen 20 to supply the cryogen requirements for vapor motor 128, liquid cryogen 18 may be used, such as by tapping conduit 93 via a connector 202 and connecting an ambient loop 204 and a conduit 206 which includes a valve 208 between connector 202 and the hereinbefore mentioned connector 168 in conduit 124.

Cryogen in conductor 124 may be maintained above the predetermined minimum pressure value during a cooling cycle, such as 80 psia when the cryogen is $CO_2$, by using the vapor pressure in vessel 16 to maintain a desired minimum pressure in conduit 124. For example, a tee 210 may be provided between conduits 174 and 176, and a tee 212 may be provided in conduit 124. A conduit 214 having a pressure regulating valve 216 is connected between tees 210 and 212, to maintain the pressure in conduit 124 above the predetermined minimum value.

In another aspect of the invention, if the temperature of the vapor at the exit conduit 156 of vapor motor 128, as sensed by sensor 92, is sufficiently low, e.g., about $-60°$ F. ($-51°$ C.), vapor from conduit 180 may be directed through an additional set of tubes (not shown) in heat exchanger 42, which would be similar to tubes 46, via a suitable conduit and control valve (not shown) disposed between conduit 180 and the additional set of tubes.

Figure 3:
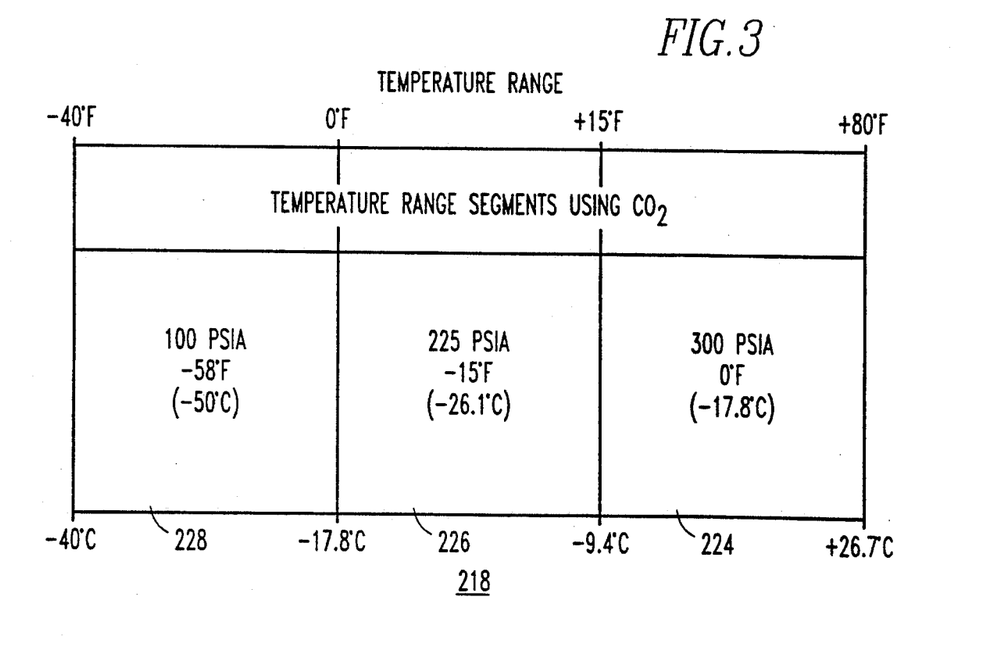
FIG. 3 is a chart which illustrates a method of cooling a conditioned space via a refrigerant source and heat exchanger means according to the teachings of the invention.

FIG. 3 is a chart 218 which illustrates a method of cooling a conditioned space to a selected set point temperature in a predetermined temperature range, via a refrigerant source and heat exchanger means, according to another aspect of the invention which expands upon the selectable evaporation temperature feature of the FIG. 3 embodiment. Implementation of the method illustrated in FIG. 3 is illustrated in refrigeration systems 219 and 221 in FIGS. 4 and 5. Components in FIGS. 4 and 5 which may be the same as in FIG. 2 are identified with like reference numbers and will not be described in detail. The refrigerant source of the method is identified as the hereinbefore described cryogenic cooling means 13 in both FIGS. 4 and 5, and the heat exchanger means of the method is identified with reference number 220 in FIG. 4, and with reference number 222 in FIG. 5.

For purposes of example, the predetermined temperature range is selected to be from $-40°$ F. to $+80°$ F. ($-40°$ C. to $+26.7°$ C.). The method includes the step of selecting a refrigerant having predetermined thermodynamic properties. For purposes of example, $CO_2$ in a cryogenic state is selected as the refrigerant, having an as delivered pressure of 300 psia, which corresponds to an evaporation temperature of the cryogen of $0°$ F. ($-17.8°$ C.).

A next step of the method is to divide the predetermined temperature range in at least first and second contiguous segments, with three contiguous segments 22, 226, and 228 being illustrated in FIG. 3, for purposes of example. The first temperature segment 224, for example, is selected to be from $+80°$ F. ($+26.7°$ C.) to $+15°$ F. ($-9.4°$ C.); the second temperature segment 226 is selected to be from $+15°$ F. ($-9.4°$ C.) to $0°$ F. ($-17.8°$ C.); and the third temperature segment 228 is selected to be from $0°$ F. ($-17.8°$ C.) to $-40°$ F. ($-40°$ C.).

The next step of the method is to select a pressure range for each of the predetermined temperature segments of the temperature range according to the thermodynamic properties of the selected refrigerant $CO_2$, to provide corresponding saturated pressure ranges which will provide evaporation temperatures suitable for handling the temperature segments. As illustrated in FIG. 3, when the selected refrigerant is $CO_2$, a saturated pressure of 300 psia, which corresponds to an evaporation temperature of $0°$ F. ($-17.8°$ C.), is suitable for the first temperature segment 224. In other words, $CO_2$ at the "as delivered" pressure of 300 psia and evaporation temperature of $0°$ F. ($-17.8°$ C.) will, when evaporated in a heat exchanger associated with a conditioned space, be able to thermodynamically cool the conditioned space to a set point temperature selected to be within the first temperature segment 224.

As illustrated in FIG. 3, a saturated pressure of 225 psia, which corresponds to an evaporation temperature of $-15°$ F. ($-26.1°$ C.), is suitable for the second temperature segment 226. In other words, $CO_2$ at a pressure of 225 psia and evaporation temperature of $-15°$ F. ($-26.1°$ C.) will, when evaporated in a heat exchanger associated with a conditioned space, be able to thermodynamically cool the conditioned space to a set point temperature selected to be within the second temperature segment 226.

As further illustrated in FIG. 3, a saturated pressure 100 psia, which corresponds to an evaporation temperature of $-58°$ F. ($-50°$ C.), is suitable for the third temperature segment 228. In other words, $CO_2$ at a pressure of 100 psia and evaporation temperature of $-58°$ F. ($-50°$ C.) will, when evaporated in a heat exchanger associated with a conditioned space, be able to thermodynamically cool the conditioned space to a set point temperature selected to be within the third temperature segment 228.

Figure 4:
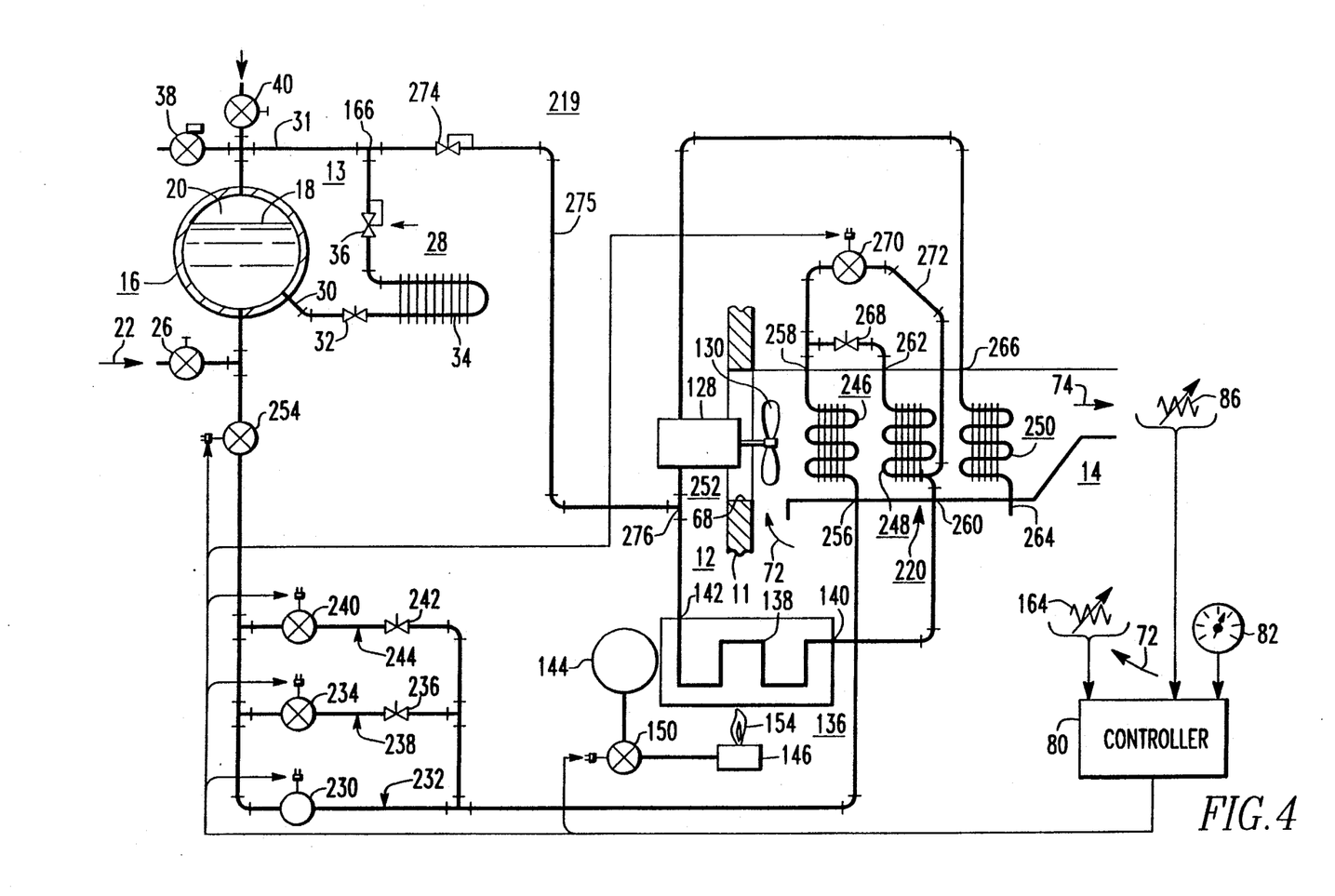
FIG. 4 is a detailed diagrammatic representation of a refrigeration system constructed according to another aspect of the invention in which the temperature of evaporation of a refrigerant is selectively controlled and optimized according to the cooling requirements of a load in the space to be conditioned.
Figure 5:
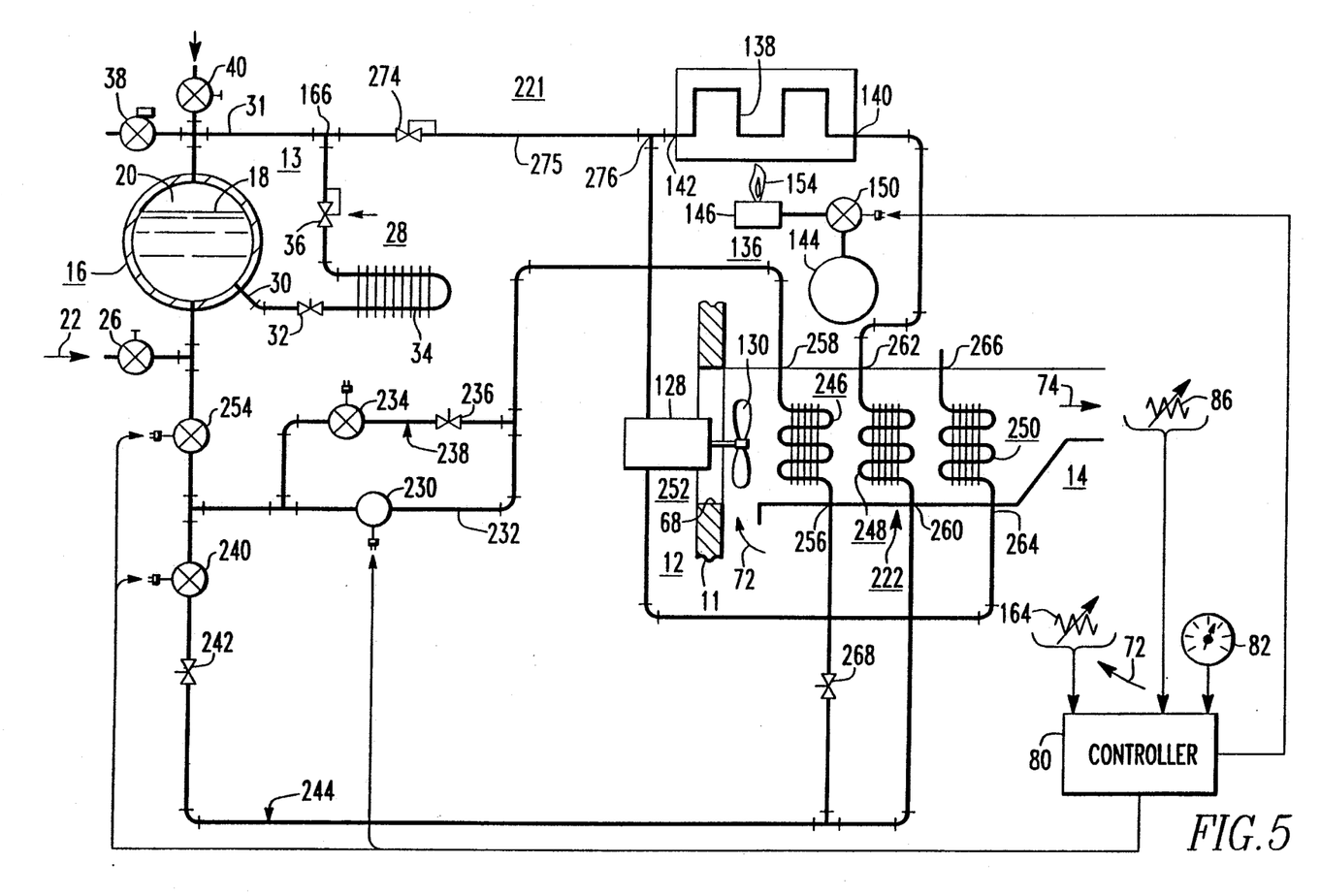
FIG. 5 is a detailed diagrammatic representation of a refrigeration system which is similar to that shown in FIG. 3, except illustrating other embodiments of the concept utilized in FIG. 3.

A next step of the method is to provide expansion devices, valves, orifices, and the like, which will provide the selected refrigerant at the corresponding saturated pressure ranges. With the method further including the step of connecting the expansion devices in selectable parallel pressure selecting or pressure related flow paths between the refrigerant source 13 and the heat exchanger means 222 or 224, to provide a pressure related flow path associated with each segment 224, 226 and 228 of the temperature range. In FIGS. 4 and 5 a normally open valve 230 is connected in a first flow path 232 to provide a pressure related flow path associated with the first temperature segment 224; a normally closed valve 234 and an expansion device or orifice 236 are connected in a second flow path 238, with expansion device 236 being selected to drop the pressure of the cryogen from 300 psia to 225 psia, to cause the second flow path 238 to function as a pressure related flow path associated with the second temperature segment 226; and, a normally closed valve 240 and an expansion device or orifice 242 are connected in a third flow path 244, with expansion device 242 being selected to drop the pressure of the cryogen from 300 psia to 100 psia, to cause the third flow path 244 to function as a pressure related flow path associated with the third temperature segment 228.

Valves 230, 234 and 240 are controlled by controller 80, as indicated by the control lines which extend from controller 80 to each of the valves. An advantage of the method is that valves 230, 234 and 240 may be on-off valves, with higher cost controllable orifice valves, while usable, not being necessary.

The method includes the step of providing a plurality of heat exchangers in the heat exchanger means 220 and 222 of FIGS. 4 and 5, such as first, second and third heat exchangers 246, 248 and 250 illustrated in FIGS. 4 and 5. The method also includes the step of providing air mover means 252, such as the hereinbefore described vapor driven motor 128 and fan or blower 130. Heating means is also provided, in a preferred embodiment of the method, for selectively heating the refrigerant vapor before being introduced into the vapor motor 128, with the heating means being the hereinbefore described heating means 136.

The method further includes the step of arranging the plurality of heat exchangers 246, 248 and 250, and the vapor motor 128, in a plurality of different selectable heat exchanger-motor refrigerant flow path configurations, with each such heat exchanger-motor flow path configuration including the vapor motor 128 and at least two of the plurality of heat exchangers. The method includes the steps of determining which temperature segment 224, 226, or 228 is associated with the selected set point temperature, i.e., which temperature segment does the selected set point temperature reside in? A pressure related flow path is then selected which is associated with the determined temperature segment, for directing flow of refrigerant from the refrigerant source 13 to the heat exchanger means 220 or 222, and a heat exchanger-motor flow path configuration is selected in response to the specific pressure related flow path selected.

More specifically, in FIGS. 4 and 5 the three pressure related flow paths 232, 238 and 244 are connected to the refrigerant source 13 via a normally closed valve 254. Also, as shown in FIGS. 4 and 5, the first heat exchanger 246 has first and second ends 256 and 258, the second heat exchanger 248 has first and second ends 260 and 262, and the third heat exchanger 250 has first and second ends 264 and 266.

Referring now specifically to FIG. 4, the first, second and third pressure related flow paths 232, 238 and 244 are each connected in parallel between valve 254 and end 256 of the first heat exchanger 246, with end 256 thus functioning as an input end, and end 258 functioning as an output end, of heat exchanger 246. The second end 258 of the first heat exchanger 246 is connected to the second end 262 of the second heat exchanger 248 via an expansion device 268 which is sized to drop the vapor pressure to about 100 psia, for example. The first end 260 of the second heat exchanger 248 is connected to the second end 266 of the third heat exchanger via the heating means 136 and the vapor motor 128. The second end 258 of the first heat exchanger 246 is also connected to the second end 266 of the third heat exchanger means via the heating means 136 and vapor motor 128, while by-passing the second heat exchanger means 248 via a valve 270 and a conduit 272. A pressure regulating valve 274 is connected from the vapor side of source 13, at tee 166, to the input side of vapor motor 128 via a conduit 275, at a tee 276, to insure that the pressure of the cryogen entering vapor motor 128 is maintained at, or above a predetermined pressure, which in the case of $CO_2$, maintains the pressure at or above 80 psia, to prevent solidification of the $CO_2$. Instead of valve 274 and conduit 275, a back pressure regulating valve may be placed in the conduit leading into vapor motor 128.

As a first example of the operation of refrigeration system 219 shown in FIG. 4 it will be assumed that the set point selector 82 is set to select a temperature associated with a non-frozen load, such as fresh produce, in conditioned space 14, such as +35° F. (+1.67° C.), which places the set point within the first segment 224 of the cooling temperature range illustrated in FIG. 3. Controller 80 opens valve 254 when cooling is required, and refrigerant flows from source 13 through valve 254, through the open valve 230 and the first pressure related flow path 232, through the first heat exchanger 246, evaporating the liquid cryogen at a temperature of 0° F. (−17.8° C.), through pressure dropping expansion device or orifice 268, through the second heat exchanger 248, through heating means 136, which may or may not add heat to the cryogen, depending upon whether or not heating is required to obtain the required air flow in conditioned space 14, through vapor motor 128, and through the third heat exchanger 250. The expansion device 268 drops the pressure, via an isenthalpic expansion, to about 100 psia, to also drop the temperature of the cryogen before it enters the second heat exchanger 248, and an isentropic expansion takes place in vapor motor 128, extracting mechanical energy from the vaporized cryogen, while lowering the pressure and temperature of the vapor, prior to directing the vapor through the third heat exchanger 250. Cryogen exiting the third heat exchanger 250 may be utilized further, collected, or exhausted, as desired. When conditioned space 14 no longer needs cooling, controller 80 closes valve 254.

Should conditioned space require heat to hold set point, or heat for defrosting the heat exchanger means 220, heating means in the form of the heat pipes 58 shown in FIG. 2 may be used, or the cryogen may be passed through heating means similar to heating means 136 prior to being directed through the heat exchanger means 220.

When the set point temperature selected by selector 82 is set to a value which falls within the second temperature segment 226, controller 80 opens valves 254 and 234, while closing valve 230. Thus, cryogen is directed through the second pressure related parallel path 238, which drops the pressure to 225 psia to provide an evaporation temperature of −15° F. (−26.1° C.). The heat exchanger-motor flow path is the same as described relative to set point temperatures which fall within the first segment 224.

When the set point temperature selected by selector 82 is set to a value which falls within the third temperature segment 228, such as −20° F. (−28.9° C.), controller 80 opens valves 254, 240 and 270, while closing valve 230. Thus, cryogen is directed through the third pressure related parallel path 244, which drops the pressure to 100 psia temperature of −58° F. (−50° C.). The heat exchanger-motor flow path is also modified for set point temperatures which fall in the third segment 228, as the now open valve 270 causes the cryogenic vapor to by-pass the second heat exchanger 248 and proceed directly to the input end 140 of heating means 136. The heat exchanger flow path is modified as the vapor pressure is dropped by flow path 244 to a point which makes it impractical to use another stage of cooling by orifice 268 and heat exchanger 248. Therefore, orifice 268 and heat exchanger 248 are by-passed when the set point temperature is in the third temperature segment.

In the refrigeration system 221 of FIG. 5, the first and second pressure related flow paths 232 and 238 are connected in parallel between valve 254 and the second end 258 of the first heat exchanger 246, while the third pressure related flow path 244 is connected between valve 254 and the first end 260 of the second heat exchanger 248. The first end 256 of the first heat exchanger 246 is connected to the first end 260 of the second heat exchanger 248 via the hereinbefore described expansion device 268, which drops the vapor pressure to about 100 psia, for example. The second end 262 of the second heat exchanger 248 is connected to the first end 264 of the third heat exchanger 250 via the heating means 136 and vapor motor 128. Pressure regulating valve 274 is connected to the input side of vapor motor 128 via conduit 275, as in the embodiment of FIG. 4.

In the operation of refrigeration system 221 shown in FIG. 5, when set point selector 82 selects a temperature which falls within the first temperature segment 224, controller 80 opens and closes valve 254, as required to maintain the temperature in conditioned space 14 within a predetermined narrow range close to the selected set point temperature. The cryogen flow path includes valve 254, the first pressure related parallel flow path 232, the first heat exchanger 246, expansion device 268, the second heat exchanger 248, heating means 136, which adds heat as required to maintain the desired air flow in conditioned space 14, vapor motor 128, and the third heat exchanger 250.

When set point selector 82 is set to a temperature value which falls within the second temperature segment 226, valves 254 and 234 are opened and valve 230 is closed, selecting the second pressure related flow path 238 and the same heat exchanger-motor flow path as used for set point temperatures in the first temperature segment 224.

When set point selector 82 is set to a temperature value which falls within the third temperature segment 228, valves 254 and 240 are opened while valve 230 is closed, selecting the third pressure related flow path 244. The heat exchanger-motor flow path is different than used for set point values in the first and second temperature segments, with the first heat exchanger 246 and expansion device 268 being by-passed for the reason pointed out relative to the FIG. 4 embodiment. Cryogen enters the second heat exchanger 248, which now functions as an evaporator, instead of heat exchanger 246 functioning to evaporate liquid cryogen. The vaporized cryogen then proceeds through heating means 136, vapor motor 128, and the third heat exchanger 250.

Figure 6:
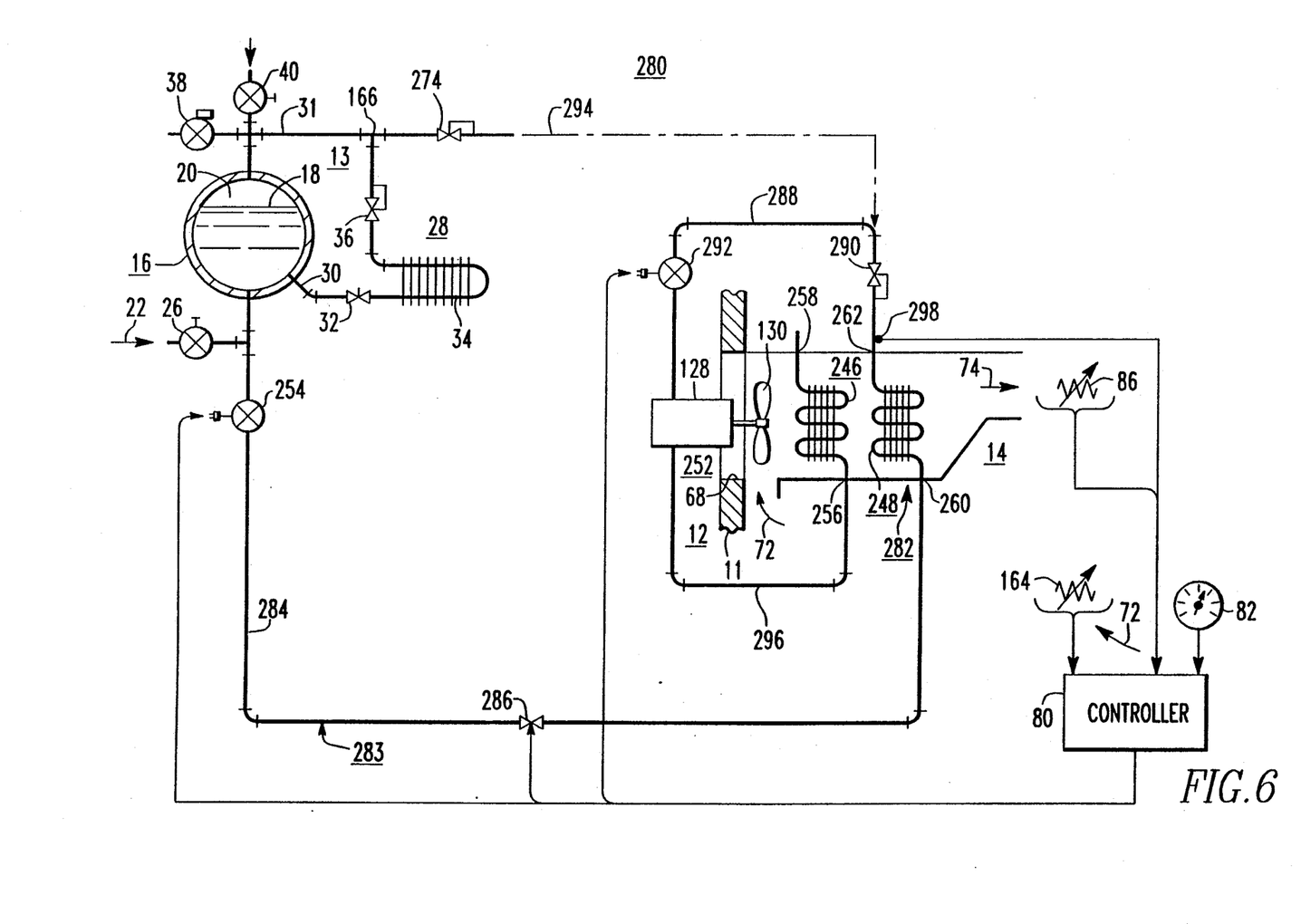
FIG. 6 is a detailed diagrammatic representation of a refrigeration system constructed according to another aspect of the invention in which the mass flow rate of a cryogen is controlled in response to the degree of superheat in the cryogen exiting an evaporator coil, and also to maintain the temperature of the air being discharged into a conditioned space at or above a predetermined floor temperature while conditioning a fresh load.

FIG. 6 is a diagrammatic representation of a refrigeration system 280 constructed according to another embodiment of the invention. Components of refrigeration system 280 which are similar to those already described relative to the refrigeration systems in FIGS. 2, 4 and 5 are indicated with like reference numbers and will not be described again in detail. Refrigeration system 280 controls the temperature of conditioned space 14 to a predetermined temperature range adjacent to a selected set point temperature via at least a cooling cycle, and includes cryogenic cooling means 13 which includes the liquid state 18. Heat exchanger means 282 is provided which defines a fluid flow path which includes at least one heat exchanger for evaporating liquid cryogen, such as heat exchanger 248, with an additional heat exchanger 246 also being illustrated.

Means 283 including a conduit 284 and modulation valve means 286, and controller 80, operably interconnect the cryogenic cooling means 13 and the first end 260 of heat exchanger 248 to implement a cooling cycle via evaporation of liquid cryogen 18 in heat exchanger 248. Controller 80 controls the size of an orifice in modulation valve means 286 to control the mass flow rate of liquid cryogen 18 from vessel 16 to heat exchanger 248. Modulation valve 286 may incorporate means for selectively blocking flow of cryogen; or, as illustrated in FIG. 6, means 283 may further include an on-off valve 254 which is controlled by controller 80 to enable flow of liquid cryogen 18 during a cooling cycle, and to terminate flow of liquid cryogen 18 when a cooling cycle is not required.

The second end 262 of heat exchanger 248 is connected to the input side of vapor motor 128 via a conduit 288. Conduit 288, as illustrated, may include a back pressure regulating valve 290. Pressure regulating valve 290 maintains the pressure of the cryogen in heat exchanger 248 above a predetermined minimum value, which, when the cryogen is $CO_2$, is selected to be above the triple point thereof. When a cooling cycle is terminated, and also when refrigeration system 280 is shut down, it is desirable to provide shut down isolation by closing valve 254 on the input side of heat exchanger 248, and by closing a valve on the output side of heat exchanger 248. Regulating valve 290 may incorporate a controllable off state; or, an on-off valve 292 may be provided in conduit 292 to provide this function. Back pressure regulating valve 290 may be eliminated, retaining only on-off valve 292, by connecting the pressure regulating valve 274, described relative to FIGS. 4 and 5, to conduit 288, as indicated by broken line 294.

Vapor motor 128 expands cryogenic vapor exiting heat exchanger 248, extracting mechanical energy from the vapor to drive motor 128, while lowering the pressure and temperature of the vapor. The output side of vapor motor 128 is connected to the first end 256 of heat exchanger 246 via a conduit 296, and the second end 258 of heat exchanger 246 may exhaust the vapor to the atmosphere, or it may be directed to still another heat exchanger in heat exchanger means 282, or it may be directed to a heat exchanger associated with another compartment of conditioned space 14, when conditioned space 14 is compartmentalized.

A temperature sensor 298 is provided in heat sensing relation with cryogen flowing within the conduit adjacent to the second end 262 of heat exchanger 248 for determining the degree of superheat in the evaporated cryogen exiting heat exchanger 248, with this temperature value being input to controller 80.

Figure 7:
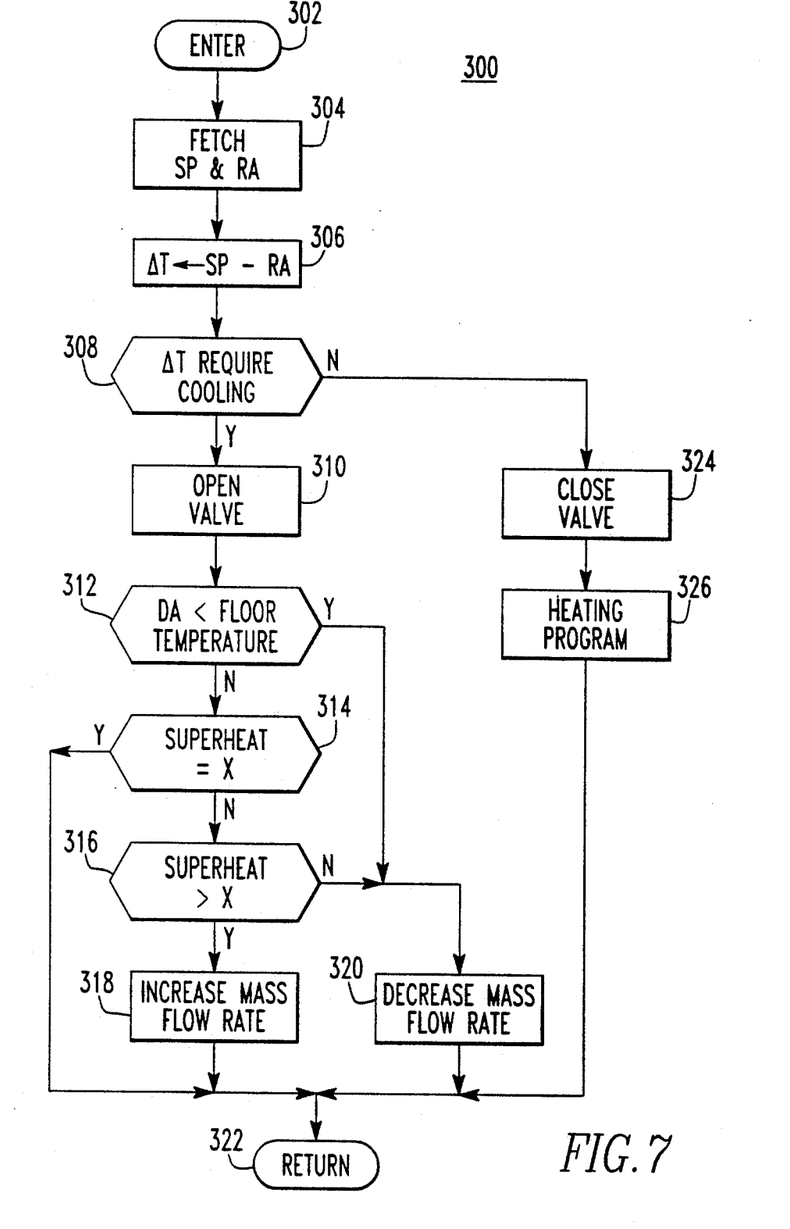
FIG. 7 is a flow diagram of a program for operating the refrigeration system of FIG. 6 according to the teachings of the invention.

FIG. 7 is a flow chart of a program 300 stored in a read-only-memory (ROM) in controller 80 for operating refrigeration system 280 according to the teachings of the invention, which teachings include modulating the mass flow rate of liquid cryogen 18 from the cryogenic cooling means 13 to heat exchanger 248 of heat exchanger means 282.

Program 300 is periodically entered at 302 and step 304 fetches the set point temperature SP set by set point selector 82 and the temperature RA of the return air 72, which is sensed by return air temperature sensor 164. Step 306 then subtracts the temperature RA of the return air 72 from the set point temperature SP to provide a value $\Delta T$. As hereinbefore stated, refrigeration system 280 holds the temperature of conditioned space 14 in a narrow temperature band adjacent to the selected set point temperature SP. When $\Delta T$ is negative and larger than the temperature "satisfied" zone adjacent to set point SP, a cooling cycle is required. When a cooling cycle is required, step 308 proceeds to step 310 which opens on-off valve 254; or, when an on-off feature is provided in modulation valve 286, control actuates valve 286 to enable flow therethrough according the controlled size of an orifice therein.

Step 312 then fetches the temperature DA of conditioned air 74 being discharged into conditioned space 14 via air mover means 252, With the temperature DA of conditioned air 74 being sensed by discharge air sensor 86. Step 312 also fetches a floor temperature value, which is stored in a random-access-memory (RAM) which is part of controller 80, with the floor temperature value being a value below which the temperature DA of discharge air 74 should not fall, such as to prevent spot freezing of a sensitive fresh load being carried in conditioned space 14. Step 312 further determines if the temperature DA of the discharge air 74 is less than the predetermined floor value. If DA is not less than the floor value, step 312 proceeds to step 314 which fetches the temperature value sensed by temperature sensor 298. Step 314 compares the temperature of the vapor exiting heat exchanger 248 with the temperature of evaporation of the cryogen in heat exchanger 248, to determine how many degrees above the temperature of evaporation the exiting cryogenic vapor is, i.e., the degree of superheat in the exiting vapor. The degree of superheat is compared with a predetermined desired degree of superheat "X", with "X" being 10 degrees, for example. If the actual superheat is not equal to "X", step 316 determines if the actual superheat is greater than "X". If the actual superheat is greater than "X", step 316 proceeds to step 318 which results in controller 80 opening the area of the orifice in modulation valve 286 to increase the mass flow rate of liquid cryogen 18 to heat exchanger 248, which will result in the evaporation of additional cryogen in heat exchanger 248 and a reduction in the degree of superheat.

When step 316 finds that the degree of superheat does not exceed "X", it is less than "X" and step 316 proceeds to step 320. Step 320 results in controller 80 reducing the area of the orifice in modulation valve 286 to reduce the mass flow rate of liquid cryogen 18 to heat exchanger 248, which will result in the evaporation of less cryogen in heat exchanger 248 and an increase in the degree of superheat. Steps 318 and 320 both proceed to program exit 322, for subsequent periodic return to program entry 302.

When step 312 finds that the temperature DA of the discharge air 74 has dropped below the predetermined floor value, steps 314, 316 and 318 are by-passed, with step 312 proceeding to step 320 which decreases the mass flow rate and increases the temperature DA of the discharge air 74. Thus, refrigeration system 280 will maintain the temperature DA of the discharge air 74 at, or above, a predetermined floor temperature, and while the floor temperature aspect of the invention is satisfied, the invention controls the degree of superheat in vaporized cryogen exiting heat exchanger 248 to a desired value.

When step 308 finds that a cooling cycle is not required, step 308 proceeds to step 324 which terminates flow of liquid cryogen 18 to heat exchanger 248, such as by closing valve 254, when provided, or by closing modulation valve 286, when valve 286 has on-off control. Step 324 then proceeds to step 326 which determines if a heating cycle is required to hold the temperature of conditioned space 14 in the "satisfied" zone adjacent to set point SP. If a heating cycle is required, the heat pipe aspect of FIG. 2 may be utilized, or other suitable means may be provided for adding heat to heat exchanger means 282, such as by directing cryogen from cryogen cooling means 13 through suitable heating means and then through heat exchanger means 282. Step 326 then proceeds to program return 322.

While not illustrated in the Figures, in order to prevent excessive pressures from building up when refrigeration system 10 is shut down, a pressure relief valve should be added at any location where cryogen may be trapped between two valves at shut down, such as between valves 254 and 292. Also, an expansion orifice, or expansion orifices, may be located at a selected location, or locations, in the cryogen flow path, depending upon the diameter of the tubing used, system pressure drops, and the like. In lieu of an expansion orifice, it would also be suitable to use one or more vapor motors, or expansion valves, to provide the desired expansion.

We claim:

1. A refrigeration system for controlling the temperature of a conditioned space to a predetermined temperature range adjacent to a selected set point temperature via heating and cooling cycles, with the refrigeration system including cryogenic cooling means, the improvement comprising:
   heat exchanger means,
   said heat exchanger means including means defining a fluid flow path, and heat pipe means,
   means operably interconnecting the fluid flow path of said heat exchanger means and the cryogenic cooling means to implement a cooling cycle,
   heating means applying heat to said heat pipe means to implement a heating cycle,
   and air mover means circulating air between the conditioned space and said heat exchanger means during said cooling and heating cycles.

2. The refrigeration system of claim 1 wherein the heating means includes a supply of combustible fuel, and means for burning the fuel during a heating cycle to heat the heat pipe means.

3. The refrigeration system of claim 1 wherein the air mover means includes fan means driven by vapor motor means, and wherein the fluid flow path of the heat exchanger means has input and output ends, and including means connecting said output end to the vapor motor means, whereby said vapor motor means is operated during a cooling cycle with cryogen, after the cryogen has traversed the fluid flow path of the heat exchanger means.

4. The refrigeration system of claim 3 wherein the means which connects the output end of the fluid flow path of the heat exchanger means to the vapor motor means during a cooling cycle includes means for heating the cryogen.

5. The refrigeration system of claim 1 wherein the air mover means includes fan means driven by vapor motor means, and wherein the cryogenic cooling means includes a supply vessel containing liquid cryogen, and including pressure building means which vaporizes liquid cryogen from the supply vessel, with the vaporized cryogen maintaining a predetermined pressure in the supply vessel, and including means connecting the supply vessel to the vapor motor means during a heating cycle to provide vaporized cryogen for driving the vapor motor means.

6. The refrigeration system of claim 5 wherein the heating means generates hot gases, and including means directing said hot gases in heat exchange relation with the pressure building means to enhance the transformation of liquid cryogen to vaporized cryogen for use by the vapor motor means.

7. The refrigeration system of claim 5 wherein the means which connects the supply vessel to the vapor motor means during a heating cycle includes heating means for heating the cryogen.

8. The refrigeration system of claim 7 including means directing cryogen from the vapor motor means in heat exchange relation with the pressure building means, to enhance the transformation of liquid cryogen to vaporized cryogen for use by the vapor motor means.

9. The refrigeration system of claim 7 wherein the heating means for heating the cryogen prior to use by the vapor motor means generates hot gases, and means directing the hot gases in heat exchange relation with the pressure building means, to enhance the transformation of liquid cryogen to vaporized cryogen for use by the vapor motor means.

10. The refrigeration system of claim 1 wherein the air mover means includes fan means driven by vapor motor means, and wherein the cryogenic cooling means includes a vessel containing cryogen in a liquid state, means for vaporizing said liquid cryogen, and directing means for directing the vaporized cryogen to the vapor motor means.

11. The refrigeration system of claim 10 wherein the directing means includes heating means for adding additional heat to the vaporized cryogen.

12. The refrigeration system of claim 10 wherein the means for vaporizing the liquid cryogen includes:
   (1) the heat exchanger means, and
   (2) pressure building means which maintains a predetermined minimum pressure in the vessel,
   with vaporized cryogen from the heat exchanger means being connected to the directing means during a cooling cycle, and with vaporized cryogen from the pressure building means being connected to the directing means during a heating cycle.

13. The refrigeration system of claim 12 including means directing cryogen from the vapor motor means in heat exchange relation with the pressure building means, to enhance the transformation of liquid cryogen to vaporized cryogen for use by the vapor motor means.

14. The refrigeration system of claim 12 wherein the heating means generates hot gases, and means directing the hot gases in heat exchange relation with the pressure building means, to enhance the transformation of liquid cryogen to vaporized cryogen for use by the vapor motor means.

15. The refrigeration system of claim 10 wherein the means for vaporizing the liquid cryogen includes:
    (1) the heat exchanger means, and
    (2) an ambient loop connectable to receive liquid cryogen during a heating cycle,
    with vaporized cryogen from the heat exchanger means being connected to the directing means during a cooling cycle, and with vaporized cryogen from the ambient loop being connected to the directing means during a heating cycle.

16. The refrigeration system of claim 1 wherein the cryogenic cooling means includes a supply vessel containing a cryogen at a predetermined pressure and temperature, and wherein the means which operably interconnects the fluid flow path of said heat exchanger means and the cryogenic cooling means to implement a cooling cycle includes at least first and second selectable parallel branches, with the first branch connecting the cryogen to the heat exchanger means at substantially the same pressure and temperature as in said supply vessel, and with the second branch including expansion means for reducing the pressure and temperature of the cryogen, and means selecting one of said branches as a function of a predetermined characteristic of the cryogen in the supply vessel and the predetermined set point temperature.

17. The refrigeration system of claim 1 wherein cryogenic cooling means includes a supply vessel containing liquid and vaporized cryogen, and pressure building means maintaining the cryogen in said vessel above a predetermined value, and wherein the fluid flow path of the heat exchanger means has an output end, and including fluid flow path means connecting said supply vessel to said output end of the heat exchanger means to maintain the pressure of the vaporized cryogen exiting the heat exchanger means above said predetermined value.

18. The refrigeration system of claim 1 including metallic fins interconnecting the fluid flow path of the heat exchanger means with the heat pipe means.

19. The refrigeration system of claim 1 wherein the fluid flow path of the heat exchanger means has first and second longitudinal ends, and a first predetermined length dimension between said first and second ends, and wherein the heat pipe means has a second predetermined length dimension which exceeds said first predetermined dimension such that the heat pipe means includes a portion which extends beyond at least one of said first and second longitudinal ends, with the heating means applying heat to said extended portion.

20. The refrigeration system of claim 1 wherein the refrigeration system includes a defrost cycle which melts water ice on the heat exchanger means, with the heating means applying heat to the heat pipe means during a defrost cycle, and means for preventing circulation of air between the conditioned space and the heat exchanger means during a defrost cycle.

21. The refrigeration system of claim 20 wherein the means which prevents circulation of air between the conditioned space and the heat exchanger means during a defrost cycle includes means for stopping the air mover means.

22. The refrigeration system of claim 20 wherein the means which prevents circulation of air between the conditioned space and the heat exchanger means during a defrost cycle includes a defrost damper disposed between the conditioned space and the heat exchanger, with said defrost damper being in a closed position during a defrost cycle.

* * * * *

UNITED STATES PATENT AND TRADEMARK OFFICE
CERTIFICATE OF CORRECTION

PATENT NO. : 5,320,167
DATED : June 14, 1994
INVENTOR(S) : Roland 1. Roehrich, et al.

It is certified that error appears in the above-indentified patent and that said Letters Patent is hereby corrected as shown below:

Title page, items [19], and item [75], should read--
INVENTOR(S):  Roland L. Roehrich, Pittsburgh, Pa.;
 Herman H. Viegas, Bloomington, Minn.

Signed and Sealed this

Twenty-fourth Day of January, 1995

Attest:

BRUCE LEHMAN

*Attesting Officer*    *Commissioner of Patents and Trademarks*